United States Patent
Iwase

(10) Patent No.: US 6,192,402 B1
(45) Date of Patent: Feb. 20, 2001

(54) NETWORK MANAGEMENT SYSTEM AND NETWORK MANAGEMENT METHOD CAPABLE OF CONTROLLING AGENT EVEN IN CASE OF FAULT OCCURRING ON LOGICAL COMMUNICATION CHANNEL

(75) Inventor: Toshio Iwase, Tokyo (JP)

(73) Assignee: NEC Corporation, Tokyo (JP)

( * ) Notice: Under 35 U.S.C. 154(b), the term of this patent shall be extended for 0 days.

(21) Appl. No.: 09/130,487

(22) Filed: Aug. 7, 1998

(30) Foreign Application Priority Data

Aug. 11, 1997 (JP) ...................................... 9-216648

(51) Int. Cl.⁷ ................................................ G06F 15/173
(52) U.S. Cl. ............................................ 709/223; 709/224
(58) Field of Search .................................. 704/223, 224, 704/202

(56) References Cited

U.S. PATENT DOCUMENTS

| | | | | |
|---|---|---|---|---|
| 5,204,955 | * | 4/1993 | Kagei et al. | 395/575 |
| 5,303,243 | * | 4/1994 | Anezaki | 371/9.1 |
| 5,561,769 | * | 10/1996 | Kumar et al. | 395/200.05 |
| 5,651,006 | * | 7/1997 | Fujino et al. | 370/408 |
| 5,815,652 | * | 9/1998 | Ote et al. | 714/31 |
| 5,909,549 | * | 6/1999 | Compliment et al. | 709/223 |
| 5,968,122 | * | 10/1999 | Schlosser et al. | 709/223 |
| 6,006,019 | * | 12/1999 | Takei | 395/200.54 |
| 6,012,152 | * | 1/2000 | Douik et al. | 714/26 |
| 6,049,828 | * | 4/2000 | Dev et al. | 709/224 |

FOREIGN PATENT DOCUMENTS 7-334445  12/1995  (JP).

* cited by examiner

*Primary Examiner*—Zarni Maung
*Assistant Examiner*—Nkosi N Trim
(74) *Attorney, Agent, or Firm*—McGuireWoods LLP

(57) ABSTRACT

A network management system, in a network having a plurality of agents and a manager for controlling management objects of the plurality of agents which are respectively connected by a logical communication channel, wherein the plurality of agents are respectively provided with a function of an acting manager receiving the management objects of the other agents as well as sending them to the manager, and the manager is provided with a function of controlling the management objects of an agent incapable of communication, through the mediation of the other agent working as the acting manager, when the manager fails to communicate with the agent because a fault has occurred on the logical communication channel and destroyed the communication.

13 Claims, 11 Drawing Sheets

NETWORK MANAGEMENT SYSTEM AND NETWORK MANAGEMENT METHOD CAPABLE OF CONTROLLING AGENT EVEN IN CASE OF FAULT OCCURRING ON LOGICAL COMMUNICATION CHANNEL

BACKGROUNDS OF THE INVENTION

1. Field of the Invention

The present invention relates to a network management system and a network management method capable of controlling an agent even when a fault occurred on a logical communication channel between a manager and the agent.

2. Description of the Related Art

The conventional network management system of this kind forms a hierarchical network management system provided with a sub-manager between an agent (management function module of a managed node) and a manager (management function module of a management node, and hereinafter referred to as an integration manager) in a large-scaled network management by use of an (SNMP). Management objects in the management range of a sub-manager are periodically collected under the control of the sub-manager, through the mediation of each agent belonging to the management range, and this collected information is notified to an integration manager in reply to a reference request from the integration manager, thereby controlling the management objects of each agent.

This kind of the conventional technique is disclosed in, for example, Japanese Patent Publication Laid-Open (Kokai) No. Heisei 7-334445, "Hierarchical Network Management System". Logical relationship between agents, sub-managers, and an integration manager in a network management system disclosed in the same publication is shown in FIG. 12. In the management system shown in FIG. 12, between a sub-manager 1210a and each agent 1220a, 1221a, the management objects are controlled by use of the SNMP and ICMP (Internet Control Message Protocol) that are management standards of the IAB (Internet Activities Board). Between the sub-manager 1210a and an agent non-installed IP node 1230a, the management objects are controlled by use of the ICMP. The sub-manager 1210a is connected with a collected MIB database 1240a holding a plurality of management object groups collected through the agents in the management range in the MIB (Management Information Base) format of tree structure. A sub-manager 1210b, an agent 1220b, an agent non-installed IP node 1230b, and a collected MIB database 1240b are connected with each other in the same logical relationship. Each sub-manager is connected to an integration manager 1200.

In a network management system constituted as mentioned above, the respective sub-managers 1210a and 1210b are provided with the SNMP agent function toward the integration manager 1200 and the information of the collected MIB database is notified in reply to a reference request from the integration manager.

The above-mentioned conventional network management system, however, sets up one unit as a manager (sub-manager) to which each agent notifies the management objects. Therefore, when a fault has occurred on a logical communication channel between a sub-manager and an agent, the agent cannot be controlled by the sub-manager and an integration manager disadvantageously, in spite of actually being in the state capable of notifying the management objects. The similar disadvantage may occur between a sub-manager and an integration manager.

Since a small-sized network containing the small number of agents needs no sub-manager originally prepared for dispersing the processing load of a manager, a hierarchical network management system consisting of an integration manager and sub-mangers would not necessarily improve the quality of the network management.

Further, in case of a hierarchical network management system consisting of an integration manager and sub-managers, a logical communication channel between an integration manager and a sub-manger and a logical communication channel between a sub-manager and an agent must be both in the normal condition in order that the integration manager might control the agents. Therefore, in a small-sized network naturally requiring no sub-manager, the quality of the network management would deteriorate on the contrary.

SUMMARY OF THE INVENTION

An object of the present invention is to provide a network management system and a network management method capable of controlling agents even when a fault has occurred on a logical communication channel between a manger and an agent.

Another object of the present invention is to provide a network management system and a network management method capable of improving the quality of the network management regardless of the size of the network.

According to the first aspect of the invention, a network management system for controlling a network having a plurality of agents and a manager for controlling management objects of the plurality of agents which are respectively connected by a logical communication channel, wherein the plurality of agents are respectively having a function of an acting manager receiving the management objects of the other agents and sending the management objects to the manager, and the manager having a function of controlling the management objects of an agent incapable of communication, through the mediation of the other agent working as the acting manager, when the manager fails to communicate with the agent because a fault has occurred on the logical communication channel and destroyed the communication.

In the preferred construction, the manager comprises a communication state monitoring means for monitoring communication state between the plurality of agents and the manager itself, an acting manager candidate inquiring means for inquiring of the plurality of agents whether communication with the agent incapable of communication is possible or not and receiving a reply from each acting manager candidate, that is an agent capable of communicating with the agent incapable of communication, an acting manager deciding means for deciding one of the acting manager candidates as an acting manager, and an acting manager controlling means for controlling the management objects of an agent incapable of communicating with the manager, through the mediation of the acting manager, while each of the agents comprises an acting manager candidate notifying means for checking whether the communication with the agent incapable of communication is possible or not, in reply to the inquiry from the manager, and when it is possible, making a reply indicating that this agent is an acting manager candidate, for the manager, and a management object notifying means for receiving the management objects of the agent incapable of communication and sending the management objects to the manager.

In the preferred construction,

3. A network management system the manager comprises a communication state monitoring means for monitoring communication state between the plurality of agents and the manager itself, an acting manager candidate inquiring means for inquiring of the plurality of agents whether communication with the agent incapable of communication is possible or not and receiving a reply from each acting manager candidate, that is an agent capable of communicating with the agent incapable of communication, an acting manager deciding means for deciding one of the acting manager candidates as an acting manager, and an acting manager controlling means for controlling the management objects of an agent incapable of communicating with the manager, through the mediation of the acting manager, while each of the agents comprises an acting manager candidate notifying means for checking whether the communication with the agent incapable of communication is possible or not, in reply to the inquiry from the manager, and when it is possible, making a reply indicating that this agent is an acting manager candidate, for the manager, a manager registration change instructing means for instructing the agent incapable of communication to change the sending destination of the management objects from the manager to this agent when this agent is specified as the acting manager by the manager, and a management object notifying means for receiving the management objects of the agent incapable of communication and sending the management objects to the manager.

In another preferred construction, in the manager, the communication state monitoring means continues to monitor the communication state with the agent incapable of communication, so to detect restoration of the failed logical communication channel, and the acting manager controlling means, if a fault on the logical communication channel is restored in the agent, stops controlling the management objects through the mediation of the acting manager, and switches the control of the management objects of the agent to the original state of the manager's direct control.

In another preferred construction, in the manager, the communication state monitoring means continues to monitor the communication state with the agent incapable of communication, so to detect restoration of the failed logical communication channel, and the acting manager controlling means, if a fault on the logical communication channel is restored in the agent, stops controlling the management objects through the mediation of the acting manager, switches the control of the management objects of the agent to the original state of the manager's direct control, and instructs the agent in which the fault on the logical communication channel has been restored, to change the sending destination of the management objects from the acting manager to the manager.

According to the second aspect of the invention, a network management method for controlling a network having a plurality of agents and a manager for controlling management objects of the plurality of agents which are respectively connected by a logical communication channel, the network management method comprising the steps of:

in the manager, monitoring communication state between the plurality of agents and the manager itself;

inquiring of the other agents whether communication with an agent incapable of communication is possible or not, when the manager fails to communicate with the agent;

upon receipt of replies from acting manager candidates, that are agents capable of communicating with the agent incapable of communication, deciding one of the acting manager candidates as an acting manager; and controlling the management objects of the agent incapable of communication with the manager, through the mediation of the acting manager, while in each of the agents, checking whether the communication with the agent incapable of communication is possible or not, in reply to the inquiry from the manager;

when the communication with the agent incapable of communication is possible, making a reply indicating that this agent is an acting manager candidate, for the manager; and receiving the management objects of the agent incapable of communication and sending the management objects to the manager.

In the preferred construction, a network management method further comprises the step of in each of the agents, between the step of making a reply for the manager and the step of sending the management objects, instructing the agent incapable of communication to change the sending destination of the management objects from the manager to this agent when this agent has been specified as the acting manager by the manager.

In the preferred construction, a network management method further comprises the steps of in the manager, continuing to monitor the communication state with the agent even after the manager failed to communicate with a given agent, so to detect restoration of the failed logical communication channel; and if the communication with the agent is restored, stopping controlling the management objects through the mediation of the acting manager, and switching the control of the management objects of the agent to the original state of the manager's direct control.

In another preferred construction, a network management method further comprises the steps of in the manager, continuing to monitor the communication state with the agent even after the manager failed to communicate with the agent, so to detect restoration of the failed logical communication channel;

if the communication with the agent is restored, stopping controlling the management objects through the mediation of the acting manager, and switching the control of the management objects of the agent to the original state of the manager's direct control; and instructing the agent in which the fault on the logical communication channel has been restored, to change the sending destination of the management objects from the acting manager to the manager.

According to another aspect of the invention, a computer readable memory storing a computer program for controlling a network management system for controlling a network having a plurality of agents and a manager for controlling management objects of the plurality of agents which are respectively connected by a logical communication channel, wherein the computer program for controlling the manager comprising the steps of:

monitoring the communication state between the plurality of agents and the manager itself;

when the manager fails to communicate with the agent, inquiring of the other agents whether communication with an agent incapable of communication is possible or not;

upon receipt of replies from acting manager candidates, that are agents capable of communication with the agent incapable of communication, deciding one of the acting manager candidates as an acting manager; and controlling the management objects of the agent incapable of communication with the manager, through the mediation of the acting manager, while the computer program for controlling the agents comprising the steps of:

checking whether the communication with the agent incapable of communication is possible or not, in reply to the inquiry from the manager;

when the communication with the agent incapable of communication is possible, making a reply indicating that this agent is an acting manager candidate, for the manager; and receiving the management objects of the agent incapable of communication and sending the management objects to the manager.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1:
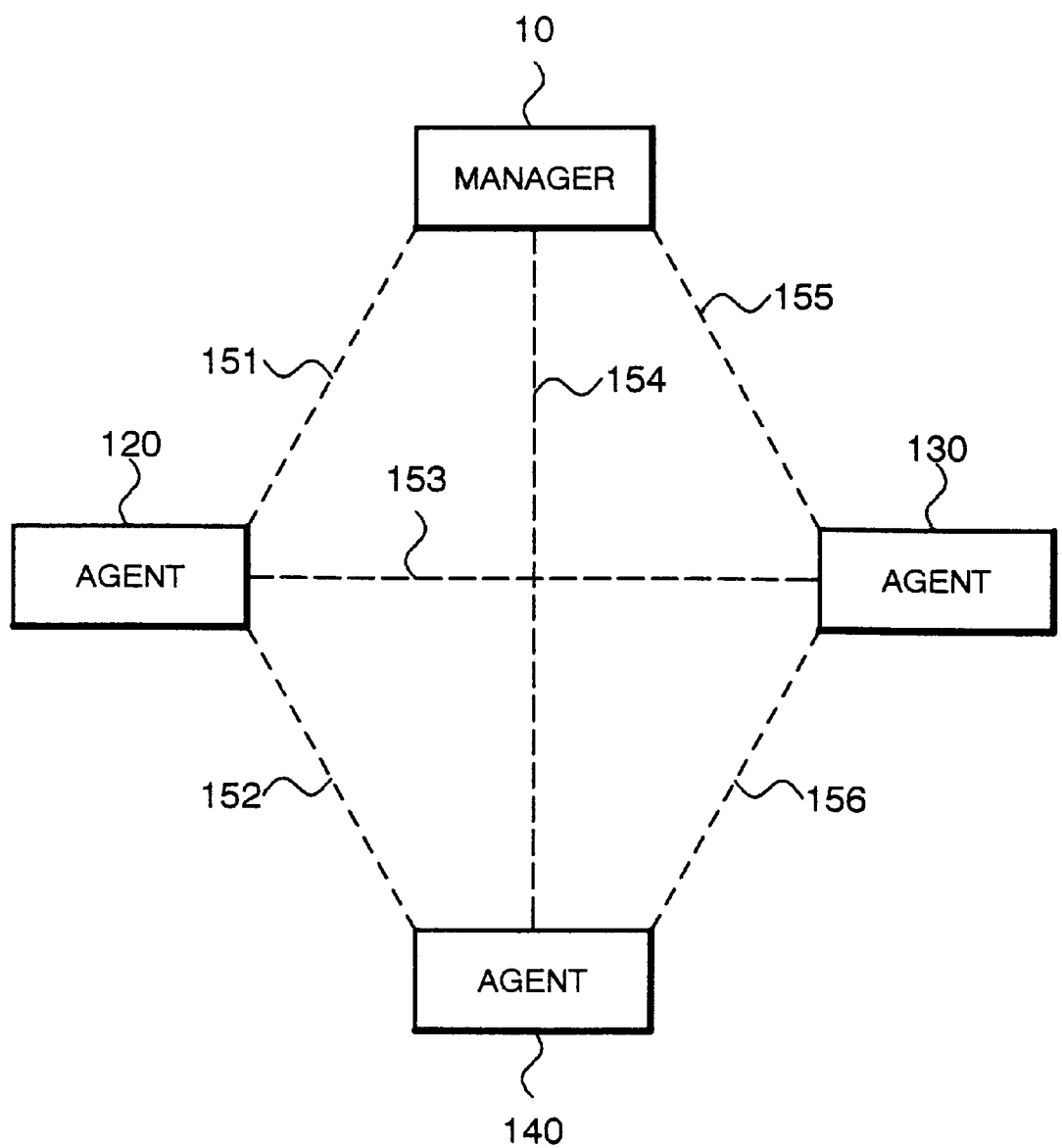
FIG. 1 is a schematic drawing showing the organization of a network by use of a network management system according to an embodiment of the present invention.

FIG. 1 is a schematic view showing the organization of a network by use of a network management system according to an embodiment of the present invention. With reference to FIG. 1, the network management system of the embodiment comprises a manager 110 for controlling agents within the network, agents 120, 130, and 140, and logical communication channels 151, 152, 153, 154, 155, and 156 for the mutual communication thereof. In the example of FIG. 1, although three agents are to be controlled by the manager 110, its number is not restricted to three. It is not always necessary to provide a logical communication channel between all the agents.

The manager 110 and the agents 120, 130, and 140 may be realized by a computer system such as a work station, a personal computer, or the like, so as to realize various functions described later by a data processor controlled by a computer program. The computer program for realizing each component of the manager 110 and the agents 120, 130, and 140 is provided, stored in a general storing medium such as a magnetic disk, an optical disk, a semiconductor memory, or the like.

The manager 110 comprises a communication state monitoring unit 111, an acting manager candidate inquiring unit 112, an acting manager deciding unit 113, and an acting manager control unit 114.

The communication state monitoring unit 111 monitors the communication state toward each agent 120, 130, and 140. The acting manager candidate inquiring unit 112 examines another agent (acting manager candidate agent) which can communicate with an agent incapable of communicating with the manager 110 owing to some fault. The acting manager deciding unit 113 decides one of the acting manager candidate agents obtained by the examination of the acting manager candidate inquiring unit 112 as an acting manager. The acting manager control unit 114 controls the management objects of the agent incapable of communication through the mediation of the acting manager decided by the acting manager deciding unit 113.

Figure 3:
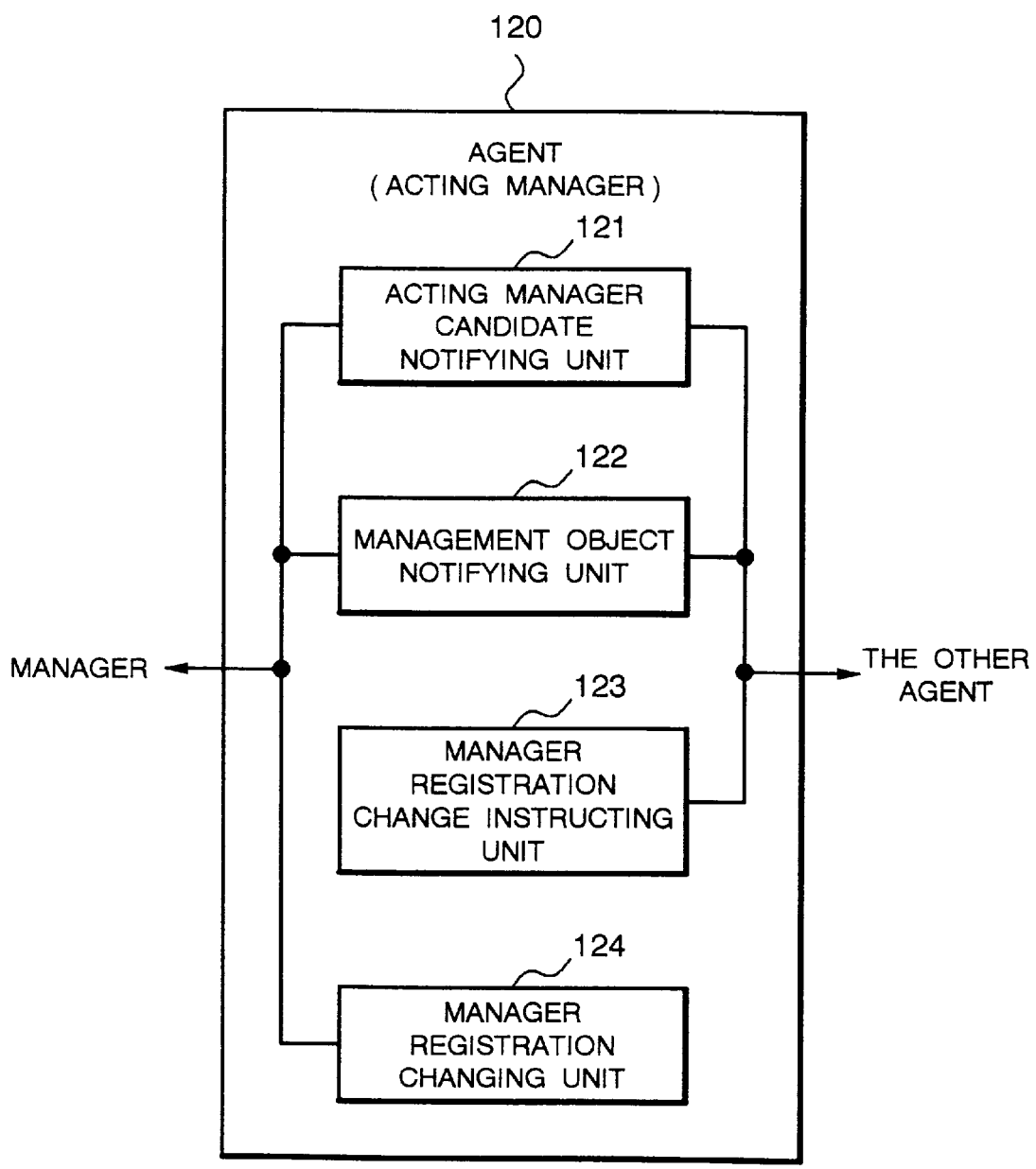
FIG. 3 is a block diagram showing the structure of an agent of the embodiment.

Each agent 120, 130, and 140 includes an acting manage candidate notifying unit 121, a management object notifying unit 122, a manger registration change instructing unit 123, and a manager registration changing unit 124 as illustrated in FIG. 3. Each agent 120, 130, and 140 has the identical structure.

The acting manager candidate notifying unit 121 checks whether communication toward the agent incapable of communicating with the manager 110 from the own self is possible or not, in reply to an inquiry from the manager 110. When the communication is possible, the unit 121 notifies the manager 110 to the effect that the own self is an acting manager candidate agent. When the own self is the acting manger, the management object notifying unit 122 notifies the manager 110 of the management objects of the other agents under its control. The manager registration change instructing unit 123 notifies the agent incapable of communicating with the manager 110 to the effect that the notify destination of the management objects is changed from the manager 110 to the own self. When the own self cannot communicate with the manager 110 and when it receives the manager registration change instruction notified by the acting manager, the manager registration changing unit 124 changes the notify destination of the management objects of the own self to the acting manager, according to the instruction.

Figure 2:
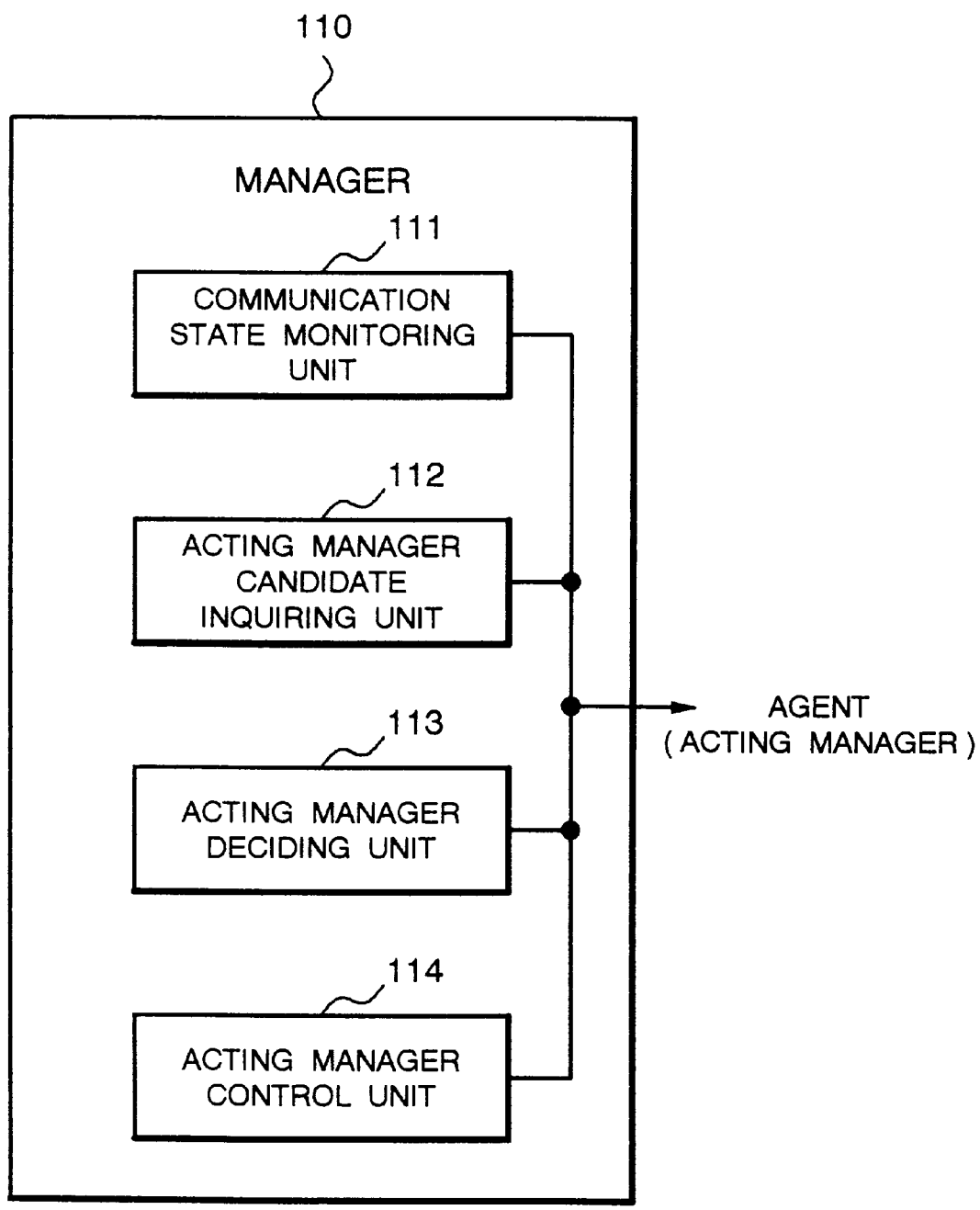
FIG. 2 is a block diagram showing the structure of a manger of the embodiment.

FIGS. 2 and 3 show only the characteristic components of the embodiment and the description of the other general components is omitted. For example, it is needless to say that actually the manager 110 is provided with a management means for directly controlling management objects of an agent without the mediation of an acting manager, and the agents 120, 130, and 140 are provided with a means of creating a management object and a means of sending the created management object to the manager, in addition to the illustrated components.

Figure 4:
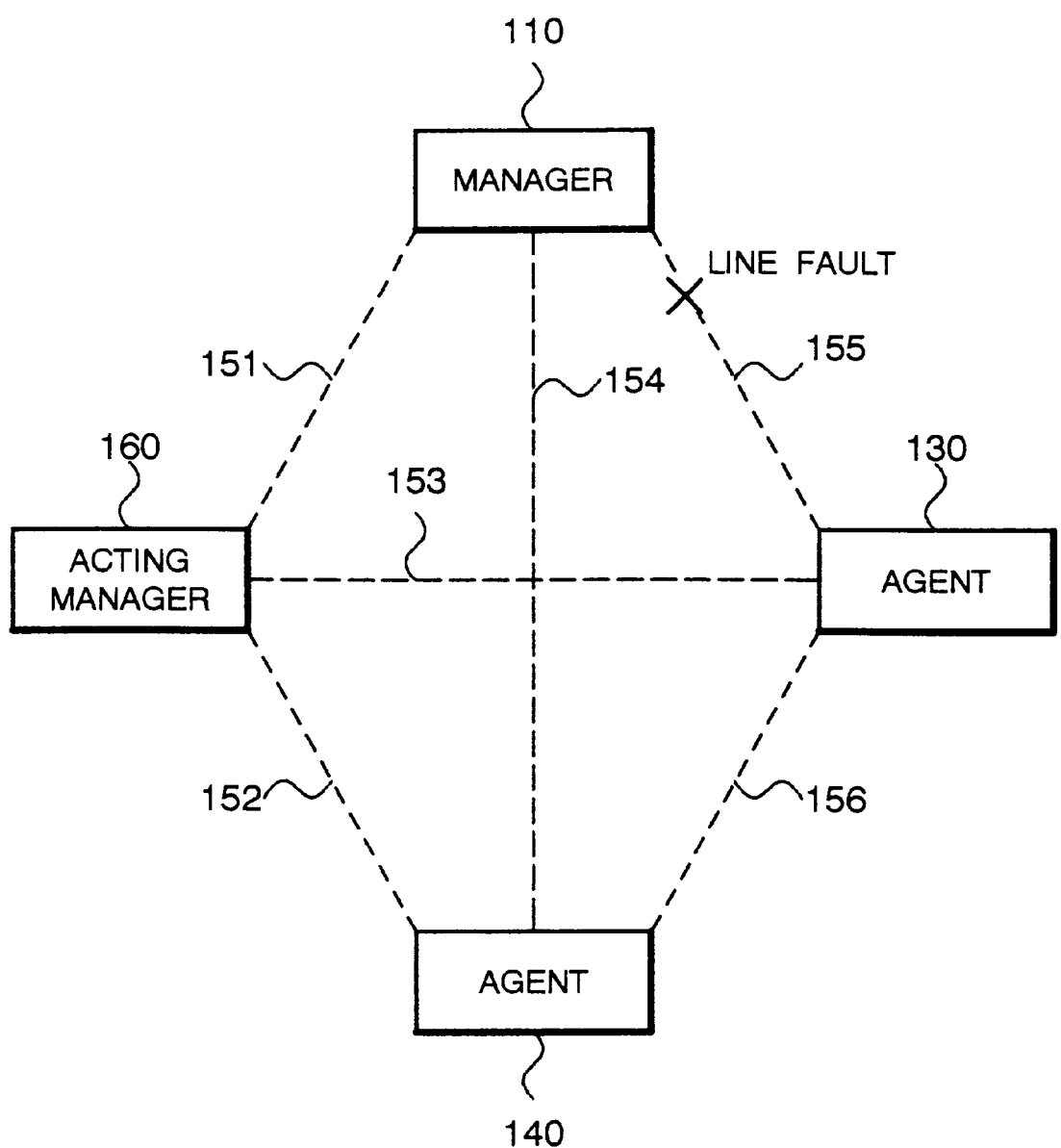
FIG. 4 is a view showing the state in which a fault has occurred on a logical communication channel between a manager and an agent in the network shown in FIG. 1.

This time, the operation of the embodiment will be described with reference to FIG. 4. As illustrated in FIG. 4, when a fault has occurred on a logical communication channel 155 between the manager 110 and the agent 130, the impossibility of communicating with the agent 130 is confirmed by the communication state monitoring unit 111 of the manager 110. The acting manager candidate inquiring unit 112 of the manager 110 inquires the possibility of communicating with the agent 130 for the other agents 120 and 140.

In reply to the inquiry from the manager 110, the acting manager candidate notifying unit 121 of each agent 120 and 140 judges whether the communication with the agent 130 is possible or not. In the possible case, the unit 121 notifies the manager 110 to the effect that the own self is an acting manager candidate agent.

The manager 110 recognizes the agent having returned a notice of an acting manager candidate agent, as an acting manager. When there exist more than one acting manager candidate agent capable of communicating with the agent 130, by way of example, the acting manager candidate agents 120 and 140, the acting manager deciding unit 113 of the manager 110 decides one of the acting manager candidate agents 120 and 140 as an acting manager. In the example of FIG. 4, the agent 120 is decided as an acting manager and the agent 120 is represented as the acting manager 160 in FIG. 4.

The acting manager control unit 114 of the manager 110 gives an instruction to the acting manager 160 so as to act for the agent 130 about the control of the management objects. Hereinafter, the manager 110 will control the management objects of the agent 130 through the mediation of the acting manager 160.

When the acting manager 160 receives an acting instruction for controlling the management objects of the agent 130, the manager registration change instructing unit 123 of the acting manager 160 notifies the agent 130 to the effect that the own self acts for the agent 130 about its management and gives an instruction to the agent 130 so as to change a manager to be registered from the agent 130 to the acting manager 160.

When the agent 130 receives the manager registration change instruction issued from the acting manager 160, the manager registration changing unit 124 of the agent 130 changes the notice destination of the management objects from the manager 110 to the acting manager 160. Upon completion of the manager registration change, the management objects of the agent 130 are controlled by the manager 110 through the mediation of the acting manager 160.

The communication state monitoring unit 111 of the manager 110 monitors the communication state even after it failed to communicate with the agent 130. As soon as confirming the restoration of the failed logical communication channel 155, the unit 111 returns the control of the management objects of the agent 130 to the original state by use of the logical communication channel 155.

Figure 5:
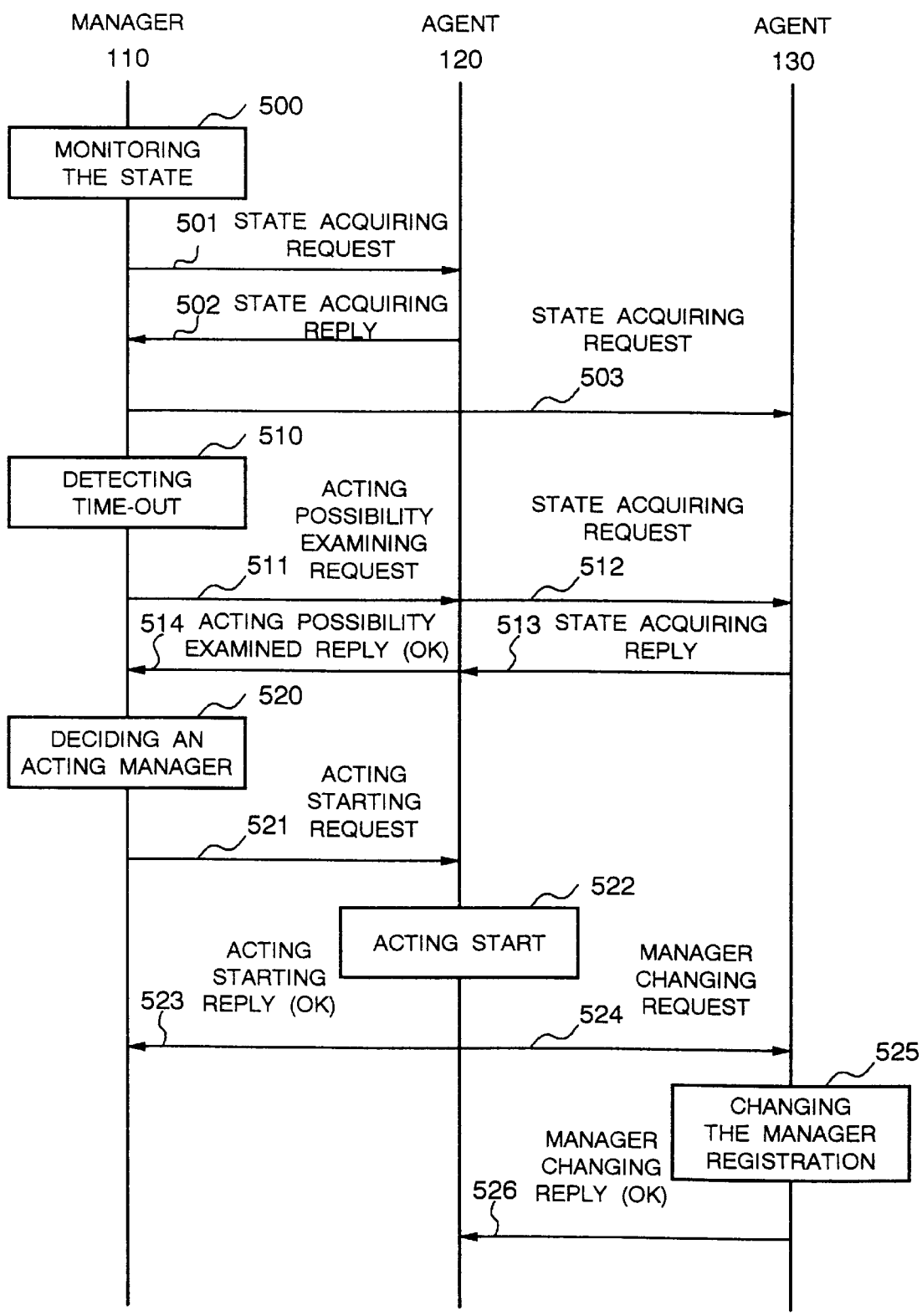
FIG. 5 is a sequence view showing the procedure of letting an acting manager act for the management of agents.

This time, the acting procedure by the acting manager as for the management of the agents will be concretely described with reference to FIG. 5. As illustrated in FIG. 5, the communication state monitoring unit 111 of the manager 110 monitors the communication state of each agent by use of, for example, the SNMP or the ICMP (500). At this time, state acquiring requests 501 and 503 are sent from the manager 110 to the agents 120 and 130, and in reply to this, a state acquiring reply 502 is sent from the agent 120 to the manager 110.

When a time-out occurs in response to the state acquiring request 503 toward the agent 130 (510), the acting manager candidate inquiring unit 112 of the manager 110 sends an acting possibility examining request 511 for inquiring the possibility of the communication with the agent 130, to the other agents 120 and 140 by use of the SNMP.

The acting manager candidate notifying unit 121 of each agent 120 and 140 confirms the possibility of the communication with the agent 130 by use of the SNMP or the ICMP upon receipt of the acting possibility examining request 511 from the manager 110, and notifies the manager 110 of the result. For example, when the acting manager candidate notifying unit 121 of the agent 120 confirms the possibility of the communication with the agent 130, the state acquiring request 512 is first sent from the acting manager candidate notifying unit 121 to the agent 130. In reply to the state acquiring request 512, the state acquiring reply 513 is sent from the agent 130 to the agent 120, and when the acting manager candidate notifying unit 121 receives it, that the communication between the agent 120 and the agent 130 is possible can be confirmed. The acting manager candidate notifying unit 121 of the agent 120, upon receipt of the state acquiring reply 513, notifies the manager 110 of the acting possibility examined reply 514 indicating that the communication to the agent 130 is possible. Hereinafter, the description will be continued on the assumption that the agent 120 can be communicated with the agent 130.

The acting manager deciding unit 113 of the manager 110 decides an acting manger, out of the agents (acting manager candidate agents) which have notified the manager 110 to the effect that the communication with the agent 130 is possible (520). Various methods can be used for deciding an acting manager. For example, the priority may be decided in advance, or an agent that first issued a notice that it can substitute may be determined as an acting manager. Here, assume that the agent 120 is determined as an acting manager, as illustrated in FIG. 2.

The manager 110 issues an acting starting request 521 requesting a start of acting management by use of the SNMP to the agent 120 decided as an acting manager. Upon receipt of the acting starting request 521, the agent 120 returns an acting starting reply 523 indicating the start of the management of the agent 130, to the manager 110, and sends a manager changing request 524 indicating that the change of the manager to the agent 130 by use of the SNMP (522). Upon receipt of the manager changing request 524, the agent 130 changes a manger to be registered (notice destination of management objects) from the manager 110 to the agent 120 (525). Upon completion of the change, the agent 130 notifies the agent 120 of the manager changing reply 526 indicating the completion of the change.

When the manager registration change has been completed in the agent 130 as mentioned above, the management objects of the agent 130 are controlled by the manager 110 through the mediation of the agent 120 (acting manager 160).

Figure 6:
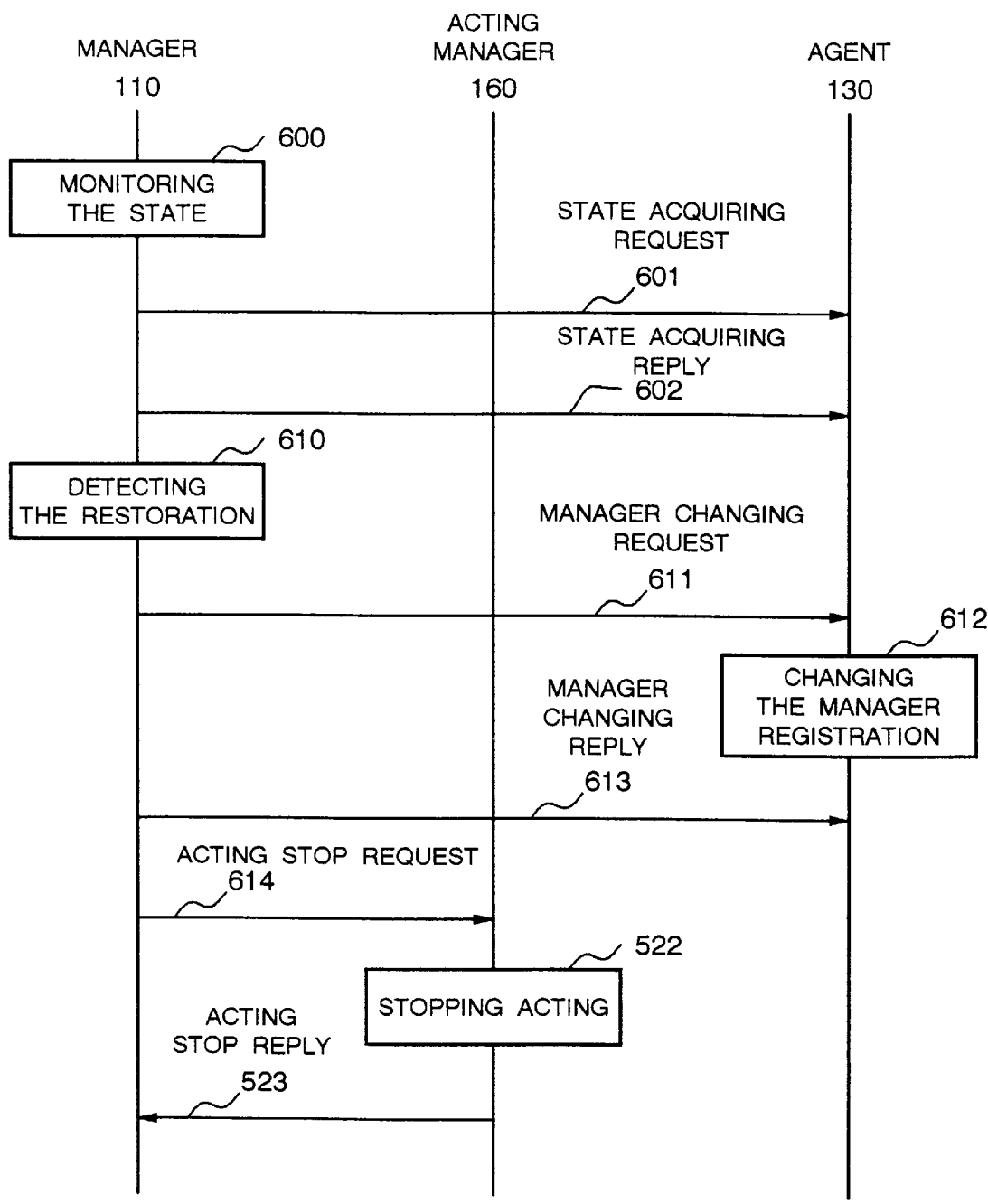
FIG. 6 is a sequence view showing the procedure of a return operation in case of restoration of a failed communication channel.

The operation in case of the restoration of a failed communication channel will be concretely described with reference to FIG. 6. The communication state monitoring unit 111 of the manager 110 monitors the communication state of the agent 130 by use of the SNMP or the ICMP while controlling the management objects of the agent 130 through the mediation of the agent 120 (acting manager 160) (600). More specifically, the state acquiring request 601 is sent from the manager 110 to the agent 130, so to check whether the state acquiring reply 602 will be returned from the agent 130 or not.

When the manager 110 receives the state acquiring reply 602, the communication state monitoring unit 111 of the manager 110 detects the restoration of the communication with the agent 130 (610). Upon detecting the restoration of the communication, the manager 110 sends the manager changing request 611 requesting to change a manger to be registered to the manager 110, to the agent 130, by use of the SNMP.

Upon receipt of the manager changing request 611, the agent 130 returns a manager to be registered, from the acting manager 160 to the manager 110 (612). It notifies the manager 110 of the manager changing reply 613 indicating that the registration of a manager has been changed. The change of a manager registration can be also performed through the mediation of the acting manager 160.

Upon completion of the change of the manager registration in the agent 130, the manager 110 sends an acting stop request 614 requesting to stop the acting management for the agent 130, to the acting manager 160, by use of the SNMP. Upon receipt of the acting stop request 614, the acting manager 160 stops the management of the management objects of the agent 130 and sends an acting stop reply 616 to the manager 110 in its reply.

Upon completion of the manager registration change of the agent 130 as mentioned above, the management objects of the agent 130 are directly controlled by the manager 110 again.

Figure 7:
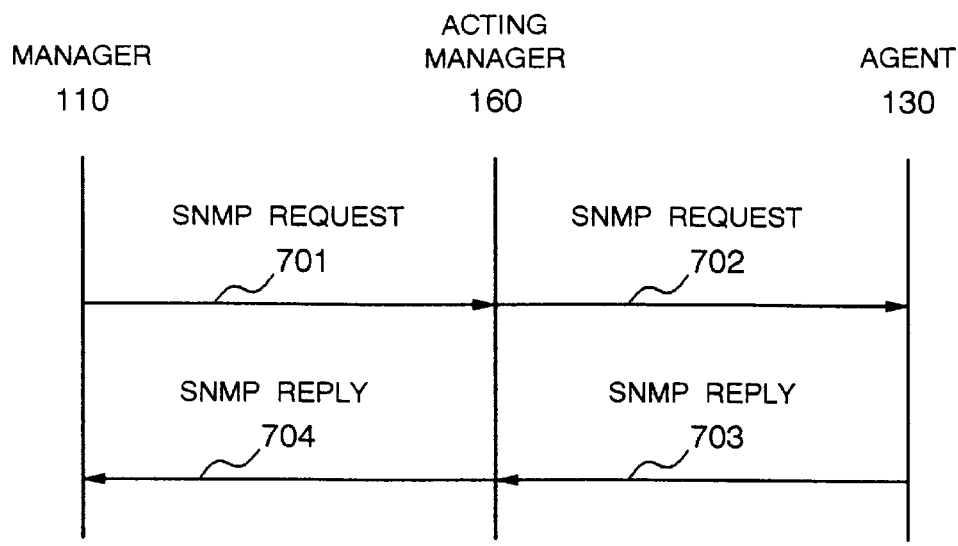
FIG. 7 is a sequence view showing one example of the management procedure of the management objects of an agent through the mediation of an acting manager.

In the above-mentioned embodiment, the management objects of an agent can be controlled through the mediation of an acting manager as illustrated in FIG. 7, for example, in such a way that an SNMP request 701 from the manager 110 is sent to the acting manager 160, the acting manager 160 sends the SNMP request 702 to the agent 130, the agent 130 sends the SNMP reply 703 to the acting manager 160 upon receipt of the SNMP request 702, and the acting manager 160 sends the SNMP reply 704 to the manager 110.

Figure 8:
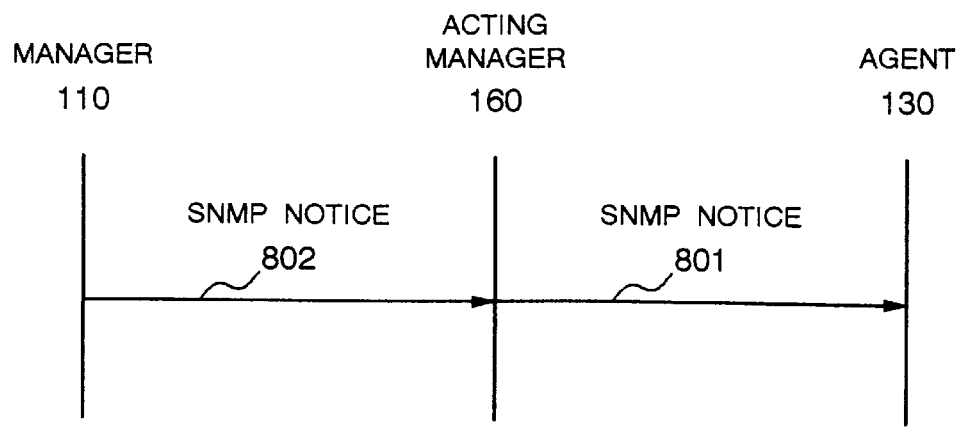
FIG. 8 is a sequence view showing one example of receiving procedure of an SNMP notice sent from an agent.

The SNMP notice to be sent from the agent 130 can be executed, as illustrated in FIG. 8, for example, by sending the SNMP notices 801 and 802 to the manager 110 through the mediation of the acting manager 160.

Here, for example, the SNMP request includes Get Request, Get Next Request, and Set Request in case of SNMPv1, and it includes Get Request, Get Next Request, Get Bulk Request, Set Request, and Inform Request in case of SNMPv2. The SNMP reply, for example, includes Get Response in case of SNMPv1 and it includes Response in case of SNMPv2. The SNMP notice, for example, includes Trap in case of SNMPv1 and it includes SNMPv2-Trap in case of SNMPv2.

The protocol of each communication among the manager 110, the agent 120 (acting agent 160), and the agent 130 is not restricted to the above-mentioned SNMP, but the other protocol may be used.

As a variation of the embodiment, when the manager 110 fails to communicate with the agent 140, in the state of FIG. 4, it may be designed in such a manner that the acting manager 160 could act for the management of a plurality of agents, by way of example, the agent 130 and the agent 140, and that the manager 110 could control the management objects of the agents 130 and 140 through the mediation of the acting manager 160.

Figure 9:
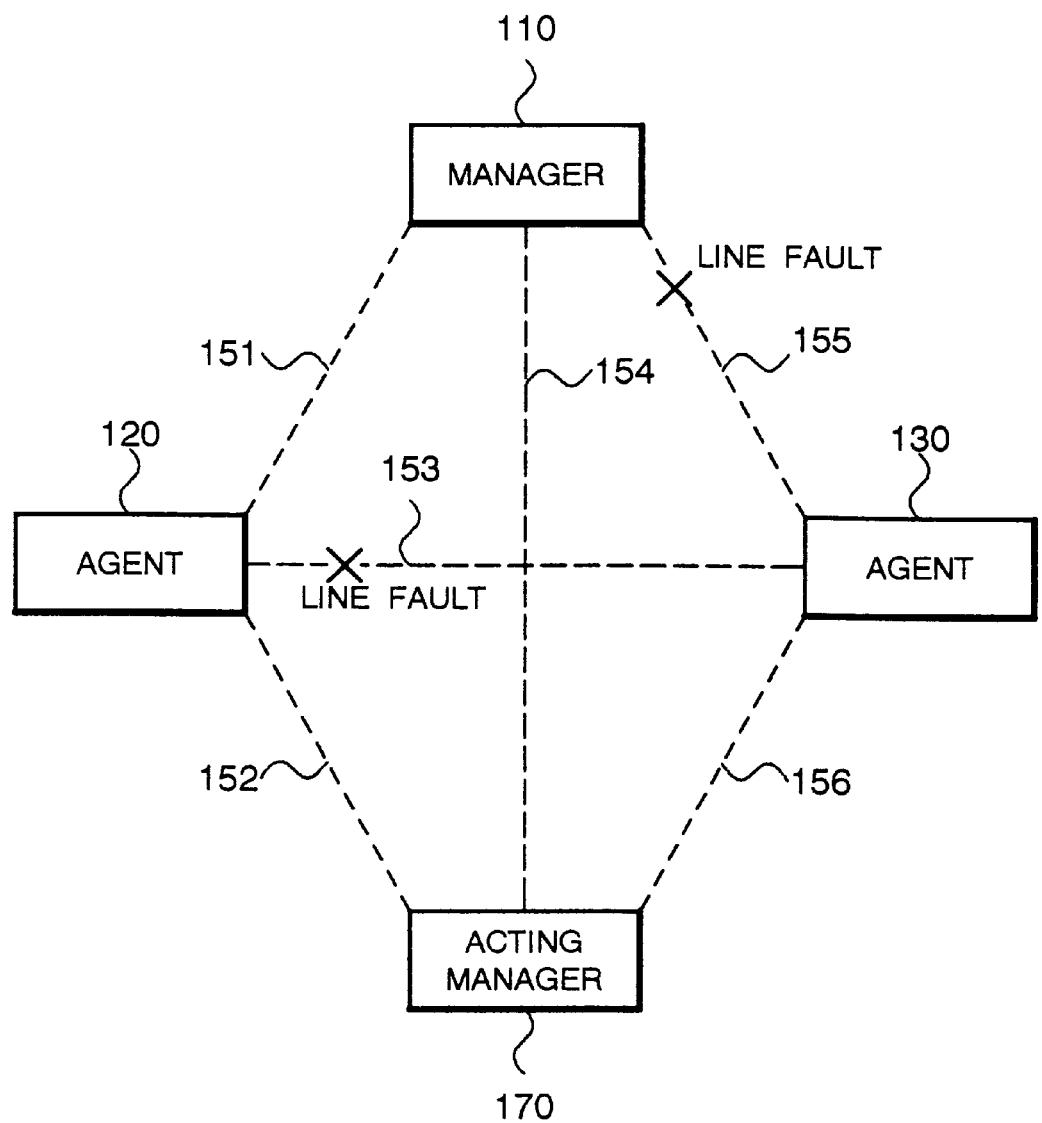
FIG. 9 is a view showing the state in which a fault has occurred on a logical communication channel between an acting manager and an agent in the network shown in FIG. 1.

As another variation, in the state of FIG. 4, by providing the acting manager 160 with a communication state monitoring means for monitoring the communication state toward an agent controlled by the acting manager 160 substitutionally, the manager 110 could control the management objects of the agent 130 successively through the mediation of the other acting agent 170 upon receipt of a notice from the acting manager 160 when a fault occurred on the logical communication channel 153 as illustrated in FIG. 9. In this case, the agent 140 is decided as the acting manager 170 instead of the acting manager 160 and the agent 140 is described as the acting manager 170 in FIG. 9.

Figure 10:
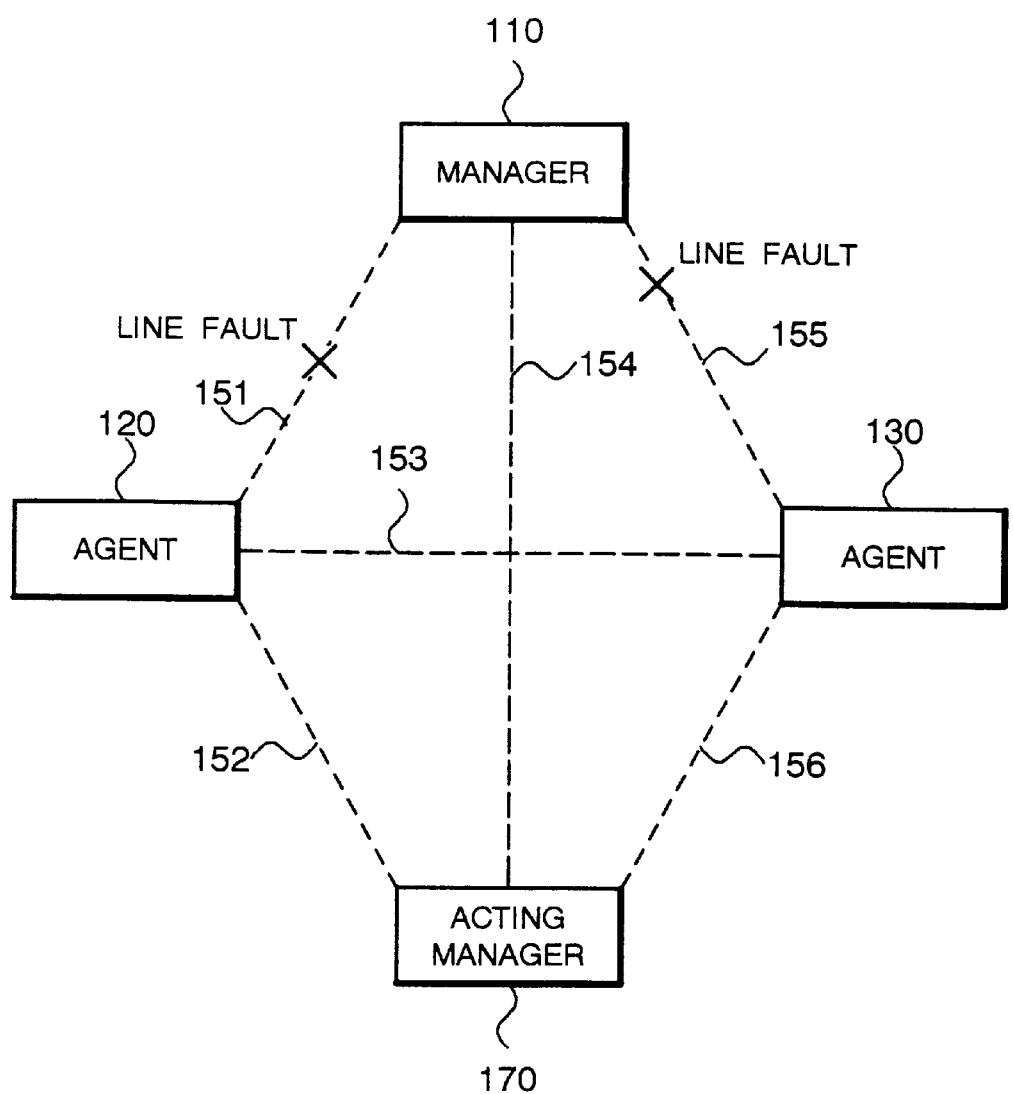
FIG. 10 is a view showing the state in which a fault has occurred on a logical communication channel between a manager and an acting manager in the network shown in FIG. 1.

As further another variation, in the state of FIG. 4, when a fault has occurred on the logical communication channel 151 between the manager 110 and the acting manager 160, it may be designed in such a manner that the acting manager 160 (agent 120) and the agent 130 could be successively controlled through the mediation of the acting manager 170 (agent 140), as illustrated in FIG. 10. In this case, the substitution of the acting manager 160 will be stopped.

Figure 11:
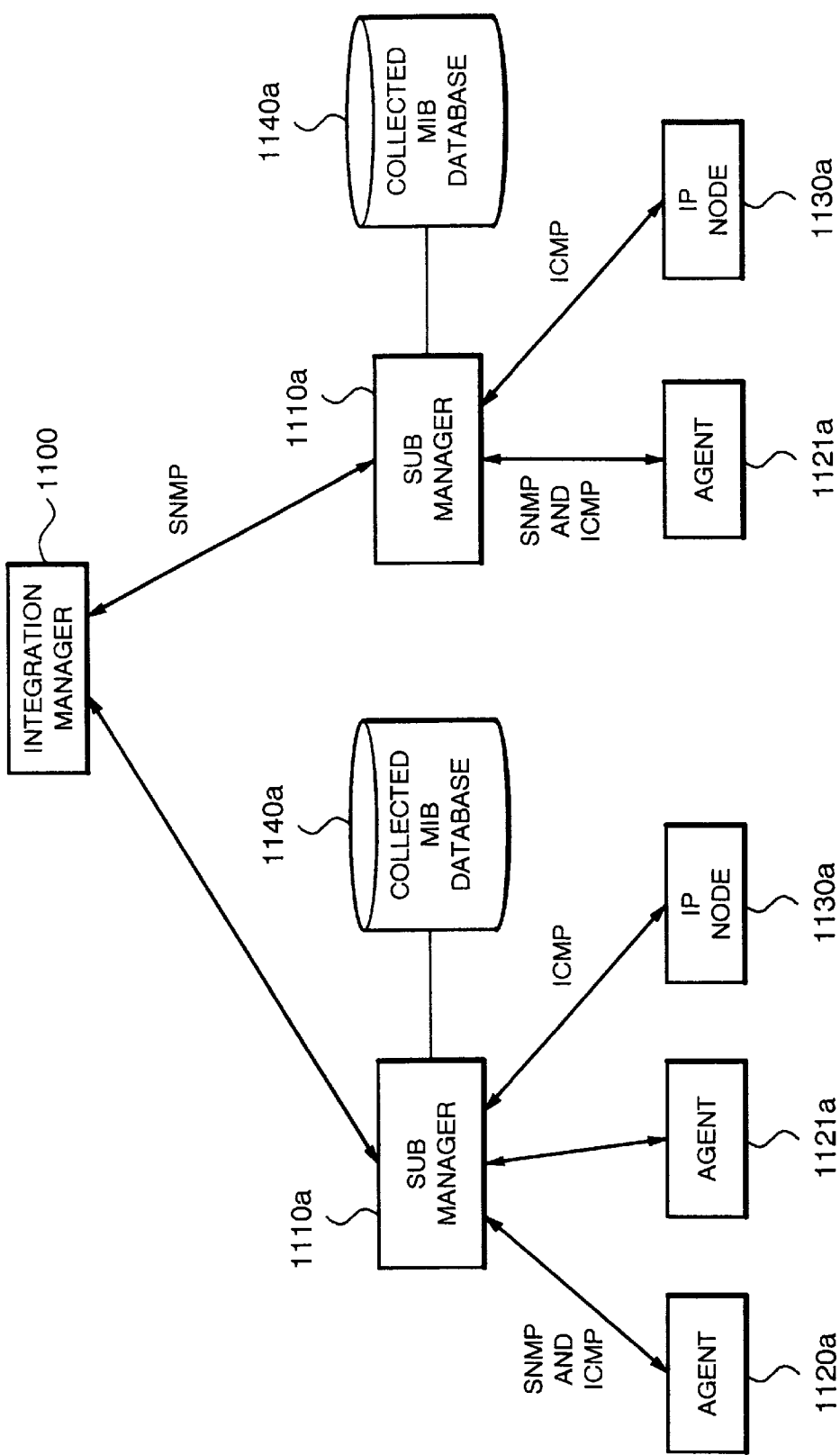
FIG. 11 is a schematic view showing the organization of a network by use of a network management system according to another embodiment of the present invention.
Figure 12:
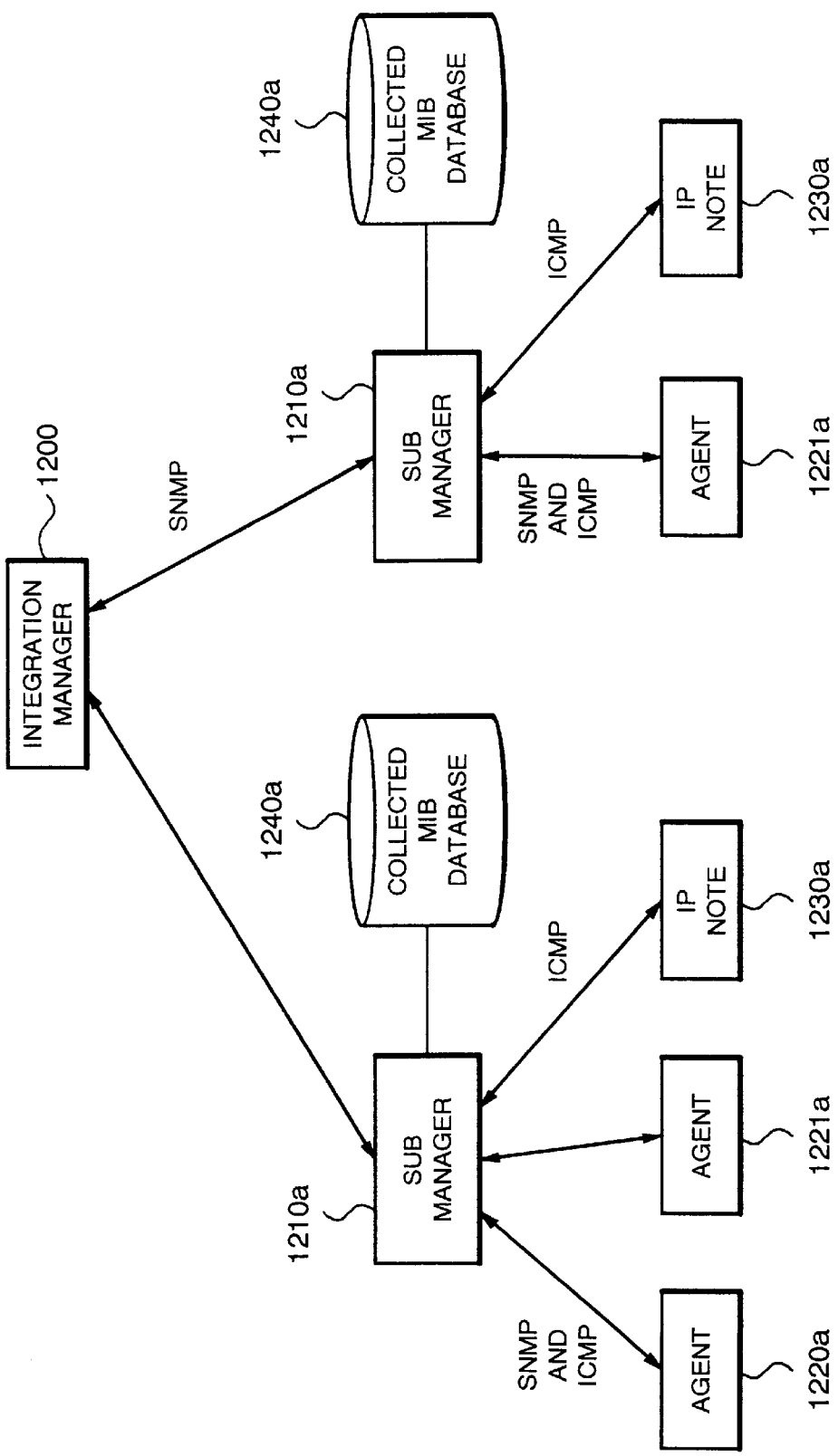
FIG. 12 is a schematic view showing the organization of a network by use of the conventional network management system.

FIG. 11 is a schematic view showing the organization of a network by use of a network management system according to another embodiment of the present invention. With reference to FIG. 11, in the network management system of the embodiment, between the sub-manager 1110a and the respective agents 1120a and 1121a, the management objects are controlled by use of the SNMP and the ICMP of the IAB management standard. Between the sub-manager 1110a and the agent non-installed IP node 1130a, the management objects are controlled by use of the ICMP. The collected MIB database 1140a, which holds a plurality of the management objects groups collected through the agents in the management range in the MIB format of the tree structure, is connected to the sub-manager 1110a. Connection is established in the similar logical relationship as for the sub-manager 1110b, the agent 1120b, the agent non-installed IP node 1130b, and the collected MIB database 1140b, and each sub-manager is connected to an integration manager 1100. That is to say, the whole logical relationship is similar to that of the above-described conventional network management system as shown in FIG. 12.

In the embodiment, the sub-managers 1110a and 1110b respectively include a communication state monitoring unit 111, an acting manager candidate inquiring unit 112, an acting manager deciding unit 113, and an acting manager control unit 114, similarly to the manager 110 shown in FIG. 2.

The respective agents 1120*a*, 1120*b*, and 1121*a* include an acting manager candidate notifying unit 121, a management object notifying unit 122, a manager registration change instructing unit 123, and a manager registration changing unit 124, similarly to the agent 120 shown in FIG. 3, and work as an acting manager between each sub-manager 1110*a* or 1110*b* and the other agent, depending on the necessity.

The operation of each sub-manager 1110*a*, 1110*b* and each agent 1120*a*, 1120*b*, and 1121*a* is similar to the operation of the manager 110 and each agent 120, 130, and 140 mentioned above, and the same control is possible as described with reference to FIGS. 4 to 10.

Further, as a variation of the embodiment, it is possible to do a network management through the mediation of an acting manager between an integration manager and a sub-manager depending on the necessity, by providing the integration manager 1100 with each function executing unit included in the sub-managers 1110*a* and 1110*b* and providing the sub-managers 1110*a* and 1110*b* with each function executing unit included in the agents 1120*a*, 1120*b*, and 1121*a*.

As set forth hereinabove, according to the network management system and the network management method of the present invention, since the management of an agent can be continued through the mediation of an acting manager, as far as the agent is in a position to send a management object, even if a fault occurred on a logical communication channel between a manager and an agent, it is able to provide a network of high network management quality.

Since it requires no sub-manager, it is able to improve the network management quality regardless of the size of the network.

Further, since it is possible to reduce the possibility of failing to control the agent by making use of the existing logical communication channel, without providing a logical communication channel between a manager and an agent with an alternative path, a path switch, or the other new device, it is able to provide a management system of high network management quality at a low cost.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A network management system for controlling a network having a plurality of agents and a manager for controlling management objects of the plurality of agents which are respectively connected by a logical communication channel, wherein plurality of agents respectively have a function of an acting manager for receiving said management objects of the other agents and sending said management objects to said manager, and said manager having a function of controlling said management objects of an agent incapable of communication, through mediation of said other agent working as the acting manager, when said manager fails to communicate with said agent because a fault occurred on said logical communication channel and destroyed the communication, wherein said manager:

inquires of said other agents whether communication with an agent incapable of communication is possible or not when said manager fails to communicate with said agent;

upon receipt of replies from acting manager candidate that are agents capable of communicating with said agent incapable of communication with said manager, deciding one of said acting manager candidates as an acting manager.

2. A network management system as set forth in claim 1, wherein said manager comprises:

a communication state monitoring means for monitoring communication state between the plurality of agents and said manager itself, an acting manager candidate inquiring means for inquiring of the plurality of agents whether communication with said agent incapable of communication is possible or not and receiving a reply from each acting manager candidate, that is an agent capable of communicating with said agent incapable of communication, an acting manager deciding means for selecting one of the acting manager candidates as an acting manager, and an acting manager controlling means for controlling said management objects of an agent incapable of communicating with said manager, through mediation of said acting manager, each of said agents comprising:

an acting manager candidate notifying means for checking whether the communication with said agent incapable of communication is possible or not, in reply to the inquiry from said manager, and when it is possible, making a reply indicating that this agent is an acting manager candidate, for said manager, and a management object notifying means for receiving said management objects of said agent incapable of communication and sending said management objects to said manager.

3. A network management system as set forth in claim 1, wherein said manager comprises:

a communication state monitoring means for monitoring communication state between the plurality of agents and said manager itself, an acting manager candidate inquiring means for inquiring of the plurality of agents whether communication with said agent incapable of communication is possible or not and receiving a reply from each acting manager candidate, that it is an agent capable of communicating with said agent incapable of communication, an acting manager deciding means for selecting one of said acting manager candidates as an acting manager, and an acting manager controlling means for controlling said management objects of an agent incapable of communicating with said manager, through the mediation of said acting manager, each of the agents comprising an acting manager candidate notifying means for checking whether the communication with said agent incapable of communication is possible or not, in reply to the inquiry from the manager, and when it is possible, making a reply indicating that this agent is an acting manager candidate for the manager, a manager registration change instructing means for instructing said agent incapable of communication to change the sending destination of said management objects from said manager to this agent when this agent is specified as said acting manager by said manager, and a management object notifying means for receiving said management objects of said agent incapable of communication and sending said management objects to said manager.

4. A network management system as set forth in claim 1, wherein in the manager, said communication state monitoring means continues to monitor the communication state with said agent incapable of communication, so to detect restoration of the failed logical communication channel, and said acting manager controlling means, if a fault on the logical communication channel is restored in said agent, stops controlling the management objects through the mediation of said acting manager, and switches the control of said management objects of said agent to the original state of the manager's direct control.

5. A network management system as set forth in claim 1, wherein in the manager, said communication state monitoring means continues to monitor the communication state with said agent incapable of communication, so to detect restoration of the failed logical communication channel, and said acting manager controlling means, if a fault on the logical communication channel is restored in said agent, stops controlling said management objects through the mediation of said acting manager, switches the control of the management objects of said agent to the original state of the manager's direct control, and instructs said agent in which the fault on the logical communication channel has been restored, to change the sending destination of said management objects from said acting manager to said manager.

6. A network management method for controlling a network having a plurality of agents and a manager for controlling management objects of the plurality of agents which are respectively connected by a logical communication channel, the network management method comprising the steps of:

in said manager, monitoring communication state between the plurality of agents and said manager itself;

inquiring of said other agents whether communication with an agent incapable of communication is possible or not, when the manager fails to communicate with said agent;

upon receipt of replies from acting manager candidates, that are agents capable of communicating with said agent incapable of communication, deciding one of said acting manager candidates as an acting manager; and controlling said management objects of said agent incapable of communication with said manager, through the mediation of said acting manager, while in each of said agents, checking whether the communication with said agent incapable of communication is possible or not, in reply to the inquiry from said manager;

when the communication with said agent incapable of communication is possible, making a reply indicating that this agent is an acting manager candidate, for said manager; and receiving said management objects of said agent incapable of communication and sending said management objects to said manager.

7. A network management method as set forth in claim 6, further comprising the step of:

in each of said agents, between said step of making a reply for said manager and said step of sending said management objects, instructing said agent incapable of communication to change the sending destination of said management objects from said manager to this agent when this agent has been specified as said acting manager by said manager.

8. A network management method as set forth in claim 6, further comprising the steps of:

in said manager, continuing to monitor the communication state with said agent even after said manager failed to communicate with a given agent, so to detect restoration of the failed logical communication channel; and if the communication with said agent is restored, stopping controlling said management objects through the mediation of said acting manager, and switching the control of said management objects of said agent to the original state of the manager's direct control.

9. A network management method as set forth in claim 6, further comprising the steps of:

in the manager, continuing to monitor the communication state with said agent even after said manager failed to communicate with said agent, so to detect restoration of the failed logical communication channel;

if the communication with said agent is restored, stopping controlling said management objects through the mediation of said acting manager, and switching the control of said management objects of said agent to the original state of the manager's direct control; and instructing said agent in which the fault on the logical communication channel has been restored, to change the sending destination of said management objects from said acting manager to said manager.

10. A computer readable memory storing a computer program for controlling a network management system for controlling a network having a plurality of agents and a manager for controlling management objects of the plurality of agents which are respectively connected by a logical communication channel, wherein the computer program for controlling the manager comprising the steps of:

monitoring the communication state between the plurality of agents and said manager itself;

when the manager fails to communicate with said agent, inquiring of the other agents whether communication with an agent incapable of communication is possible or not;

upon receipt of replies from acting manager candidates, that are agents capable of communication with said agent incapable of communication, deciding one of said acting manager candidates as an acting manager; and controlling said management objects of said agent incapable of communication with said manager, through the mediation of said acting manager, while the computer program for controlling the agents comprising the steps of:

checking whether the communication with said agent incapable of communication is possible or not, in reply to the inquiry from said manager;

when the communication with said agent incapable of communication is possible, making a reply indicating that this agent is an acting manager candidate, for said manager; and receiving said management objects of said agent incapable of communication and sending said management objects to said manager.

11. A computer readable memory as set froth in claim 10, wherein the computer program for controlling the agents comprises the step of between said step of making a reply for said manager and said step of sending said management objects, instructing said agent incapable of communication to change the sending destination of said management objects from said manager to this agent when this agent has been specified as said acting manager by said manager.

12. A computer readable memory as set forth in claim 10, wherein the computer program for controlling the manager comprising the steps of:

continuing to monitor the communication state with said agent even after the manager failed to communicate with said agent, so to detect restoration of the failed logical communication channel; and if the communication with said agent is restored, stopping controlling said management objects through the mediation of said acting manager, and switching the control of said management objects of said agent to the original state of the manager's direct control.

13. A computer readable memory as set forth in claim 10, wherein the computer program for controlling the manager comprising the steps of continuing to monitor the communication state with said agent even after said manager failed to communicate with said agent, so to detect restoration of the failed logical communication channel;

if the communication with said agent is restored, stopping controlling said management objects through the mediation of said acting manager, and switching the control of said management objects of said agent to the original state of the manager's direct control; and instructing said agent in which the fault on the logical communication channel has been restored, to change the sending destination of said management objects from said acting manager to said manager.

* * * * *